United States Patent Office 3,226,092
Patented Dec. 28, 1965

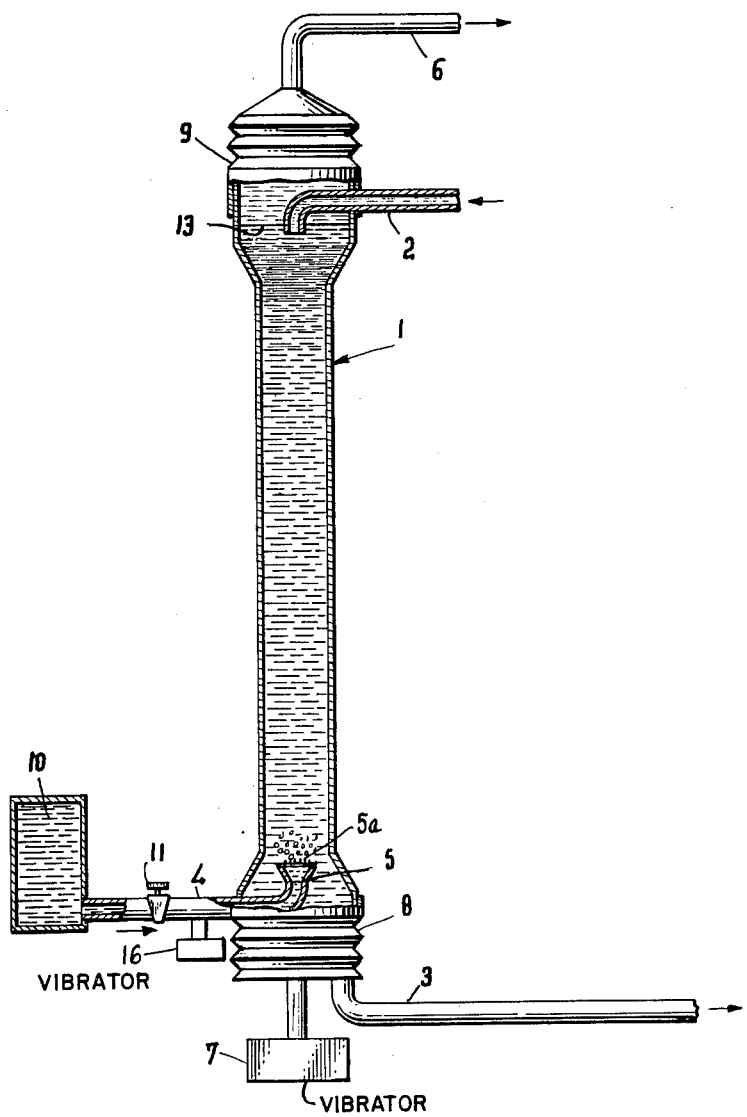

3,226,092
SPRAY-TYPE PROCESSING COLUMNS WITH
PULSED CONTINUOUS PHASE
Geoffroy Graham, 10 Coursde la Liberation, Grenoble,
Isere, France; Jacques Hure, 20 bis Rue la Fontaine,
Fontenay-aux-Roses, France; and Rose Saint-James,
9 Rue du General Niox, Paris 16, France
Filed Apr. 26, 1963, Ser. No. 276,039
Claims priority, application France, May 9, 1962,
896,912, Patent 1,330,250
5 Claims. (Cl. 259—2)

The present invention relates to a spray-type pulsed column for the liquid-liquid processing of two phases which are either immiscible or partly miscible.

It is found necessary in columns for liquid-liquid processing between two immiscible or partially miscible phases to carry out processes of heat transfer, mass transfer and even chemical reactions which can in certain cases bring about a modification of the nature of the dispersed liquid phase, for example as a result of gasification or solidification accompanied by change of molecular weight.

In these processes, it is sought to ensure that the contacting of the two liquid phases should be as effective as possible.

Studies made by the present applicants have shown that it is possible to produce favorable action on the transfer of mass or of heat or even chemical reactions in pulsed columns without packing by operating under certain conditions of frequency and of amplitude.

It has in fact been found on the one hand that if the continuous phase is pulsed at the natural frequency of the dispersed phase droplets, these latter will be the seat of substantial form oscillations with the result that the transfer or reaction processes will thus be appreciably increased. For example, in the case of droplets of the usual diameter (of the order of 1 millimeter) the natural frequency is located as a rule within the range of 25 to 75 cycles per second. This resonant frequency increases when the diameter of the droplets decreases.

Furthermore, it has been observed under these conditions of frequency that if the pulse amplitude is increased, the form oscillations of the droplets are either maintained or increased, and that in addition, this increase in amplitude brings about the reversal of the relative velocity of droplets and continuous phase during a certain part of the pulsation period. Under these conditions, there is superimposed on the downward motion or upward motion of the droplets in the continuous phase a periodic back-and-forth motion of said phase along the surface of the droplets with the result that the transfer or reaction processes are accordingly increased.

The value of the maximum amplitude of oscillation which the droplets are capable of withstanding without disintegrating is a reciprocal function of the diameter of said droplets.

It accordingly follows that in a pulsed column in which it is desired to carry out these two processes which are favorable to a mass transfer, for example the form oscillation of the droplets and the reversal of their relative velocity with respect to the continuous phase, it will be necessary to operate at a predetermined pulse frequency and with maximum amplitude, the values of these two factors being a function of the diameter of the droplets.

The result thereby achieved is that maximum efficiency of the column will be obtained with a dispersed phase of droplets having a uniform diameter and will be achieved, for example, by feeding the dispersed phase into the column in the form of homogeneous droplets so as to provide the possibility of regulating the frequency and the amplitude for a very precisely defined diameter of droplets.

The above-mentioned uniformity of size of the droplets which is favorable to the uniform processing of the dispersed phase further makes it possible to work in the vicinity of the maximum throughput of the column. In fact, in a heterogeneous size distribution, the maximum throughput is limited by the retention of the smallest droplets.

Tests carried out by the present applicants have shown in the case of spray-type pulsed columns that the above conditions for the achievement of a maximum transfer could be fulfilled only if a certain number of precautions were taken, on the one hand in order to prevent the liquid jet to be dispersed from being sprayed in such manner as to present a highly uneven size distribution of droplets, and on the other hand in order to prevent the occurrence of cavitation in the interior of the column.

In accordance with a first characteristic feature of the present invention, uniform size distribution is obtained by imparting substantial rigidity to the jet so as to prevent this latter from being forced back to the injector with the pulsating downward flow of the continuous phase, thereby ruling out any danger of admission of the continuous phase inside the injector. This rigidity can be obtained by providing upstream of the injector a head loss which maintains a high overpressure.

Since a very precise delivery is in any case required in order to obtain the requisite diameter of droplets and the predetermined corresponding pulse frequency in accordance with the invention, provision must be made for a device which is designed to regulate the rate at which the dispersed phase is supplied. The said device, which can be a valve, for example, can be mounted either upstream or downstream of said head loss or even so as to coincide therewith, the regulating valve being in this latter case chosen with a high head loss coefficient.

In accordance with another characteristic feature of the invention, the column is closed at the top end by means of an elastic member, for example a diaphragm or bellows, which follows the pulsating motion in order to permit the operation to be carried out with the maximum vibrational amplitude which corresponds to the diameter of the droplets.

In accordance with yet another characteristic feature of the invention, the internal pressure of the column is set at a minimum pressure which corresponds to the threshold of cavitation under the dynamic conditions of pulsation, inasmuch as cavitation would result in an abnormal operation of the column.

The installation of the spray-type pulsed column which is thus improved in accordance with the invention makes it possible to form homogeneous droplets of predetermined diameter and to vibrate at the natural frequency of the said droplets and with substantial amplitude, so that the conditions which are necessary for maximum transfer are accordingly fulfilled.

Moreover, inasmuch as the vibrational frequency can be limited, for example, by the nature of the liquid, by the pressure, temperature or cavitation, provision can advantageously be made in combination with the vibration of the continuous phase, for the vibration of the dispersed phase by means of a vibratory device, for example, which is mounted on the pipe through which the dispersed phase is supplied.

The frequency of this vibration must be very high, for example of the order of five to ten times the value of the vibrational frequency of the continuous phase.

One non-limitative form of embodiment will now be described in reference to the accompanying diagrammatic figure.

The extraction column is designated by the reference 1, the continuous phase being admitted at 2 and withdrawn at 3, while the dispersed phase is fed in at 4 by means of an injector 5 which is fitted with a number of nozzles 5a.

The dispersed phase is withdrawn at 6.

The column comprises a vibrator 7 above which is mounted a bellows 8 and the vibrations of which are thereby transmitted to the continuous phase.

In accordance with the invention, the column is fitted with a second bellows 9 which is located at the top of the column 1 and closes the column while following the vibrational movement in harmony therewith.

The column is completely filled with liquid and comprises an interface 13 between the continuous phase and the dispersed phase, the said interface being located immediately above the continuous phase inlet 2. The column is maintained under a pressure of 1 kilogram approximately.

The phase to be dispersed is fed from a tank 10 under a pressure of 2 kilograms per square centimeter, while a pressure reducing means such as the valve 11 located in the admission pipe 4 upstream of the injector 5 and having a high head loss coefficient creates a variable loss of head in such manner as to ensure a suitable rate of admission of the light phase while at the same time permitting a pressure on the upstream side of the valve which is sufficient to give to the jet a certain rigidity and to forestall any possible admission of the continuous phase inside the nozzles. A vibratory device 16 may be mounted on the pipe 4 between the valve 11 and the injector 5 to vibrate the liquid in the pipe. The vibratory device 16 is adapted to vibrate at a frequency which is higher than the rate of vibrational frequency of the vibrator 7.

The cross-sectional area of the column at the level of the injector 5 has been increased in order to take into account the obstruction created by the presence of the injector and in order not to increase in consequence the amplitude of pulsation at the level of the emission which, were it not for such a precaution, would be disturbed.

The installation as described in the foregoing makes it possible to produce homogeneous droplets, the volume of which is the quotient of the flow which passes through each opening of the injector divided by the vibrational frequency.

By the judicious choice of the frequency, of the flow rate of the phase to be dispersed and of the number of openings of the injector, it is accordingly made possible to regulate an operation of the column in such manner as to vibrate at the resonant frequency of the droplets (the uniformity of which is ensured and the diameter of which can be chosen) with a view to producing substantial oscillations of form of the droplets in order to increase the mass transfer.

There will now be given below by way of example the results which have been obtained during a test carried out in the column which has been described in the case of an isobutyl alcohol-water exchange.

The continuous phase is constituted by water which is introduced at 2 at a rate of 10 liters per hour and withdrawn at 3, while the phase to be dispersed is constituted by isobutanol (isobutyl alcohol) which is introduced at 4 at a rate of 2 liters per hour and is withdrawn at 6, the column being at a pressure of 1 kilogram per square centimeter, the feed tank 10 for supplying isobutanol being at a pressure of 2 kilograms per square centimeter, the valve cock 11 being so regulated that the introduction of isobutanol in the column at 4 is effected at a pressure which is slightly higher than 1 kilogram per square centimeter.

The injector 5 is made up of 26 nozzles each 1 millimeter in diameter and supplying, by means of a pulsation of the vibrator 7 of 34 cycles per second under an amplitude of 2.5 millimeters, uniform droplets each 1 millimeter in diameter, the height of transfer unit (HTU) being in this case 25 centimeters.

The present invention is not limited to the mode of execution which has been described and illustrated but is intended on the contrary to include within its scope all alternative forms.

It accordingly follows that the injector could be placed at the top of the column while the heavy phase, the droplets of which would have a downflowing motion, could be dispersed in the light phase which would then be fed into the bottom of the column without dispersion.

It would also be possible to disperse both phases by introducing the heavy phase through an injector which is arranged at the top of the column while the light phase is fed through a injector which is disposed at the base of the column, the bottom portion of the said column being filled with heavy phase and the top portion of the column being filled with light phase with an interface located substantially half-way up the column.

What we claim is:

1. A spray-type pulsed column for liquid-liquid processing with pulsation of the continuous phase to provide for maximum transfer between the dispersed phase and the continuous phase, comprising: a vertical processing column; means located adjacent one end of said column for introducing continuous phase liquid into said column at a predetermined rate and pressure; means located adjacent the other end of said column for withdrawing said continuous phase liquid from said column at a predetermined rate to maintain said column of continuous phase liquid under a predetermined pressure; an injector disposed in said column adjacent said other end of said column for introducing at a predetermined rate, uniform-sized droplets of a liquid in the dispersed phase into said continuous phase liquid; means for supplying said liquid to be dispersed to said injector at a pressure between at least as great as and slightly greater than said predetermined pressure of said column; means located adjacent said one end of said column for withdrawing said dispersed phase from said column; vibrator means connected to said other end of said column for pulsing the liquid in said column, said vibrator being vibrated at substantially the resonant frequency of said droplets and at substantially the maximum amplitude which said droplets are capable of withstanding without disintegrating; and an elastic member forming a closure for said one end of said column, said elastic member being expanded and contracted by the pulsed phases of the liquid in said column and in harmony therewith.

2. A column in accordance with claim 1 in which said means for supplying said liquid to be dispersed includes a pressure reducing means having an inlet and an outlet; means connecting said inlet with a source of said liquid to be dispersed maintained under a substantially higher pressure than said predetermined pressure of said column; and means connecting said outlet of said pressure reducing means and said injector, whereby the jets of said injector have imparted thereto, by the pressure of said liquid to be dispersed, a high degree of rigidity preventing the admission, as a result of pulsating said liquid in said column, of said continuous phase into said injector.

3. A column in accordance with claim 1 wherein said means for supplying said liquid to be dispersed to said injector includes a pipe connected to said injector through which said liquid to be dispersed flows; and a vibratory device mounted on said pipe for vibrating said dispersed phase at a frequency higher than the frequency of vibration of said vibrator means connected to the other end of said column.

4. A method for increasing the liquid-liquid processing between the continuous phase and the dispersed phase in a spray-type pulsed column, comprising: introducing said continuous phase liquid into one end of said column at a predetermined rate and pressure; withdrawing said continuous phase liquid from the other end of said column at a predetermined rate; injecting at a predetermined rate and at a pressure between at least as great as and slightly greater than said predetermined pressure of said column, uniform-sized droplets of a liquid in the dispersed phase into said continuous phase liquid at said other end of said column and withdrawing said dispersed phase from said one end of said column at a predetermined rate while vibrating said column of liquid at substantially the resonant frequency of said droplets and at substantially the maximum amplitude of oscillation which said droplets are capable of withstanding without disintegrating and maintaining said column of liquids under a predetermined pressure sufficient to prevent the occurrence of caviation in the interior thereof.

5. A method in according with claim 4 including the step of vibrating said droplets as they are being injected into said continuous phase at a frequency higher than the frequency at which said column of liquid is being vibrated.

References Cited by the Examiner

UNITED STATES PATENTS

| | | | |
|---|---|---|---|
| 2,090,496 | 8/1937 | Wynn | 259—95 |
| 2,364,892 | 12/1944 | Elgin | 23—270 X |
| 2,818,324 | 12/1957 | Thornton | 23—310 X |

WALTER A. SCHEEL, *Primary Examiner.*

JOHN M. BELL, *Assistant Examiner.*